(12) United States Patent
Togashi

(10) Patent No.: US 8,400,573 B2
(45) Date of Patent: Mar. 19, 2013

(54) POLARIZATION CONVERSION OPTICAL SYSTEM AND LIQUID CRYSTAL PROJECTION APPARATUS INCLUDING THE SAME

(75) Inventor: Mitsuhiro Togashi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 12/626,331

(22) Filed: Nov. 25, 2009

(65) Prior Publication Data

US 2010/0128186 A1    May 27, 2010

(30) Foreign Application Priority Data

Nov. 25, 2008  (JP) ................................ 2008-300192
Sep. 28, 2009  (KR) ........................ 10-2009-0091777

(51) Int. Cl.
*G02F 1/1335*    (2006.01)
(52) U.S. Cl. ...................... 349/9; 349/5; 349/8; 40/361
(58) Field of Classification Search ................. 349/5–9; 359/483, 487; 40/361
See application file for complete search history.

(56) References Cited

U.S. PATENT DOCUMENTS

| 5,898,521 | A  | * | 4/1999  | Okada ..................... 359/485.03 |
| 6,040,942 | A  | * | 3/2000  | Bergmann ............... 359/485.02 |
| 6,175,448 | B1 | * | 1/2001  | Xie et al. ................. 359/484.05 |
| 7,119,957 | B2 |   | 10/2006 | Itoh et al. |
| 7,280,459 | B2 | * | 10/2007 | Dang et al. .............. 369/112.17 |
| 2002/0005987 | A1 | * | 1/2002 | Wills et al. .................... 359/497 |

FOREIGN PATENT DOCUMENTS

| JP | 3555610 B2 | 5/2004 |
| JP | 2007-79317 A | 3/2007 |

* cited by examiner

*Primary Examiner* — Huyen Ngo
(74) *Attorney, Agent, or Firm* — Sughrue Mion, PLLC

(57) ABSTRACT

A polarization converting optical system and a liquid crystal projection apparatus including the polarization conversion optical system are provided. The polarization conversion optical system includes a light incident surface; a light exit surface having first and second light exit regions; a half-wave plate disposed on the first light exit region; and a plurality of polarization separating surfaces, between the light incident surface and the light exit surface, which divide light into first S-polarization and P-polarization components and second S-polarization and P-polarization components, deviating the second S-polarization component and the first P-polarization component in a direction inclined with respect to an optical axis, and emitting the S-polarization components through the first light exit region and emit the P-polarization components through the second light exit region.

15 Claims, 7 Drawing Sheets

POLARIZATION CONVERSION OPTICAL SYSTEM AND LIQUID CRYSTAL PROJECTION APPARATUS INCLUDING THE SAME

CROSS-REFERENCE TO RELATED PATENT APPLICATION

This application claims the benefit of Japanese Patent Application No. 2008-300192, filed on Nov. 25, 2008, in the Japanese Intellectual Property Office and Korean Patent Application No. 10-2009-91777, filed on Sep. 28, 2009, in the Korean Intellectual Property Office, the disclosures of which are incorporated herein in their entirety by reference.

BACKGROUND

1. Field of the Invention

Apparatuses and methods consistent with exemplary embodiments relate to a polarization conversion optical system and a liquid crystal projection apparatus including the polarization conversion optical system.

2. Description of the Related Art

Illuminating optical systems used in liquid crystal projectors (liquid crystal projection apparatuses) generally include a polarization conversion optical system which controls a polarization direction of illuminating light in order to improve an illuminating efficiency.

Japanese Patent Laid-open publication No. 2002-797317 (reference 1) discloses a polarization conversion optical system in which a plurality of polarization-separating prisms are disposed in front of a light source.

Japanese Patent Publication No. 3555610 (reference 2) discloses a polarization conversion optical system including a deviation prism, a lens array, a polarization separating prism array, and an exiting lens.

However, the above conventional polarization conversion optical systems and the liquid crystal projection apparatus have problems that both technologies disclosed in references 1 and 2 split polarization by transmitting a polarization component along an optical axis and reflecting the other polarization component in a direction perpendicular to the optical axis with one (a first polarization separating prism) of a plurality of polarization separating prisms which are arranged in parallel. In addition, the polarization component reflected by the first polarization separating prism is reflected in an optical axis direction by another polarization separating prism (hereinafter, a second polarization separating prism) which is adjacent to the first polarization separating prism. In addition, the polarization direction is rotated 90° by a polarization conversion device such as a half-wave plate (half-phase difference plate) to convert the polarization direction, and one of the lights transmitted through the first and second polarization separating prisms is controlled to be in the same polarization direction as the other to be output.

Therefore, in reference 1, for example, the pair of the first and second polarization separating prisms is replaced in such a way that two adjacent first polarization separating prisms face each other, a bundle of illuminating rays is incident on a range of the two first polarization separating prisms which are arranged on a center portion of the incident illuminating flux so as to irradiate the illuminating flux, the polarization direction of which is controlled, having a diameter that is twice of the incident illuminating flux. In addition, luminance distribution of the illuminating flux is made uniform by a rod integrator, and then, the illuminating flux is irradiated onto a liquid crystal panel. In this case, the illuminating flux is irradiated to the liquid crystal panel after the diameter of the illuminating flux incident on the first polarization separating prism is enlarged to twice the diameter, and accordingly, the light source emits light of high intensity in order to ensure a sufficient quantity of light on a projection screen. In particular, when a surface light source such as a light emitting diode (LED) is used, a sufficient quantity of light may not be ensured.

In addition, according to reference 2, in an array of the first and second polarization separating prisms and the polarization conversion optical system, the first polarization separating prism and the second polarization separating prism are alternately disposed in parallel in a direction perpendicular to the optical axis. The above polarization conversion optical system substantially has the same structure as that of reference 1, and thus, a cross-sectional area of the output flux is twice of the cross-sectional area of the incident flux. Therefore, the illuminating flux that is incident on the polarization separating prism array is condensed by the deviation prism and the lens array, and then, is incident on the first polarization separating prisms which are arranged alternately.

Therefore, the diameter of the flux emitted from the light source may be equal to the diameter of the flux condensed on the exiting lens of the polarization separating prism array; however, the optical system including the deviation prism, the lens array, and the exiting lens is required. Thus, a lot of quantity of light is lost, and the structure of the optical system becomes complex due to a lot of components.

SUMMARY OF THE INVENTION

One or more exemplary embodiments provide a polarization conversion optical system of a simple structure, which may emit a illuminating flux, a polarization direction of which is aligned, without enlarging a diameter of the illuminating flux, and a liquid crystal projection apparatus including the polarization conversion optical system.

According to an aspect of an exemplary embodiment, there is provided a polarization conversion optical system including: a light incident surface, on which light is incident along an optical axis, the light incident surface divided into a plurality of light incident regions; a light exit surface, having a light transmitting area which is not larger than an area of the light incident surface, and divided into a plurality of light exit regions; a polarization conversion device facing the first light exit region, which converts a polarization direction of light incident thereon by 90°; and a plurality of polarization separating surfaces which divide polarizations of the light incident on the plurality of light incident regions into a first polarization component and a second polarization component which are perpendicular to each other, and by deviating at least one polarization component of the first and second polarization components in a direction inclined with respect to the optical axis, and which emits the first polarization component through the first light exit region and emits the second polarization component through the second light exit region, which is region not including the first region. The first and second light exit regions may be common transmitting regions which transmit the first and second polarization components respectively from the plurality of the polarization separating surfaces. The polarization separating surfaces may include: a prism surface of a first prism which transmits the first polarization component without refraction and which refracts the second polarization component to be inclined with respect to the optical axis; and a prism surface of a second prism which transmits the second polarization component without refraction and which refracts the first polarization component to be inclined with respect to the optical axis. The first prism and the second prism may be a Rochon prism and a Senarmont prism, or a Senarmont prism and a Rochon prism, respectively. The polarization separating surfaces may include polarization hologram surfaces. The polarization conversion optical system may further include blazed gratings, corresponding to the light exit surface, which change the direction of the bundles emitted from the light exit surface according to the polarization components so as to emit substantially parallel light.

According to an aspect of another exemplary embodiment, there is provided a method of converting polarization, the method including: making light incident on a light incident surface, which is divided into a plurality of light incident regions; receiving, at a plurality of polarization separating surfaces, light incident from the light incident surface, and dividing polarizations of the light incident on the plurality of polarization separating surfaces into a first polarization component and a second polarization component which are perpendicular to each other, deviating at least one of the first and second polarization components in a direction inclined with respect to the optical axis; receiving at a light exit surface, the first polarization component and the second polarization component, the light exit surface having a light transmitting area which is less than an area of the light incident surface, and being divided into at least first and second light exit regions, wherein the first polarization component is emitted through the first light exit region and the second polarization component is emitted through the second light exit region, which is region not including the first region; and changing a polarization direction of the light transmitted through the first light exit region by 90°. The first and second light exit regions are common transmitting regions which transmit the first and second polarization components respectively from the plurality of the polarization separating surfaces. The polarization separating surfaces may include: a prism surface of a first prism which transmits the first polarization component without refraction and refracts the second polarization component to be inclined with respect to the optical axis; and a prism surface of a second prism which transmits the second polarization component without refraction and refracts the first polarization component to be inclined with respect to the optical axis. The polarization separating surfaces may include polarization hologram surfaces for dividing the light into the first and second polarization components. The method may further include changing the direction of the bundles emitted from the light exit surface according to the polarization components so as to align the emitting direction of the light constantly by using blazed gratings corresponding to the light exit surface.

According to another aspect of the present invention, there is provided a liquid crystal projection apparatus including the polarization conversion optical system. The liquid crystal projection apparatus may include: a cross-dichroic prism; one or more light sources facing incident surfaces of the cross-dichroic prism; a polarization conversion optical system disposed between each of the light sources and the incident surfaces of the cross-dichroic prism; a liquid crystal panel disposed between each of the polarization conversion optical systems and the incident surfaces of the cross-dichroic prism; and a projection lens facing an exit surface of the cross-dichroic prism. The liquid crystal projection apparatus may further include one or more light tunnels disposed between the incident surfaces of the cross-dichroic prism and the one or more light sources.

BRIEF DESCRIPTION OF THE DRAWINGS

The above and other aspects will become more apparent from the following detailed description of exemplary embodiments thereof with reference to the attached drawings in which.

DETAILED DESCRIPTION OF EXEMPLARY EMBODIMENTS

Figure 1:
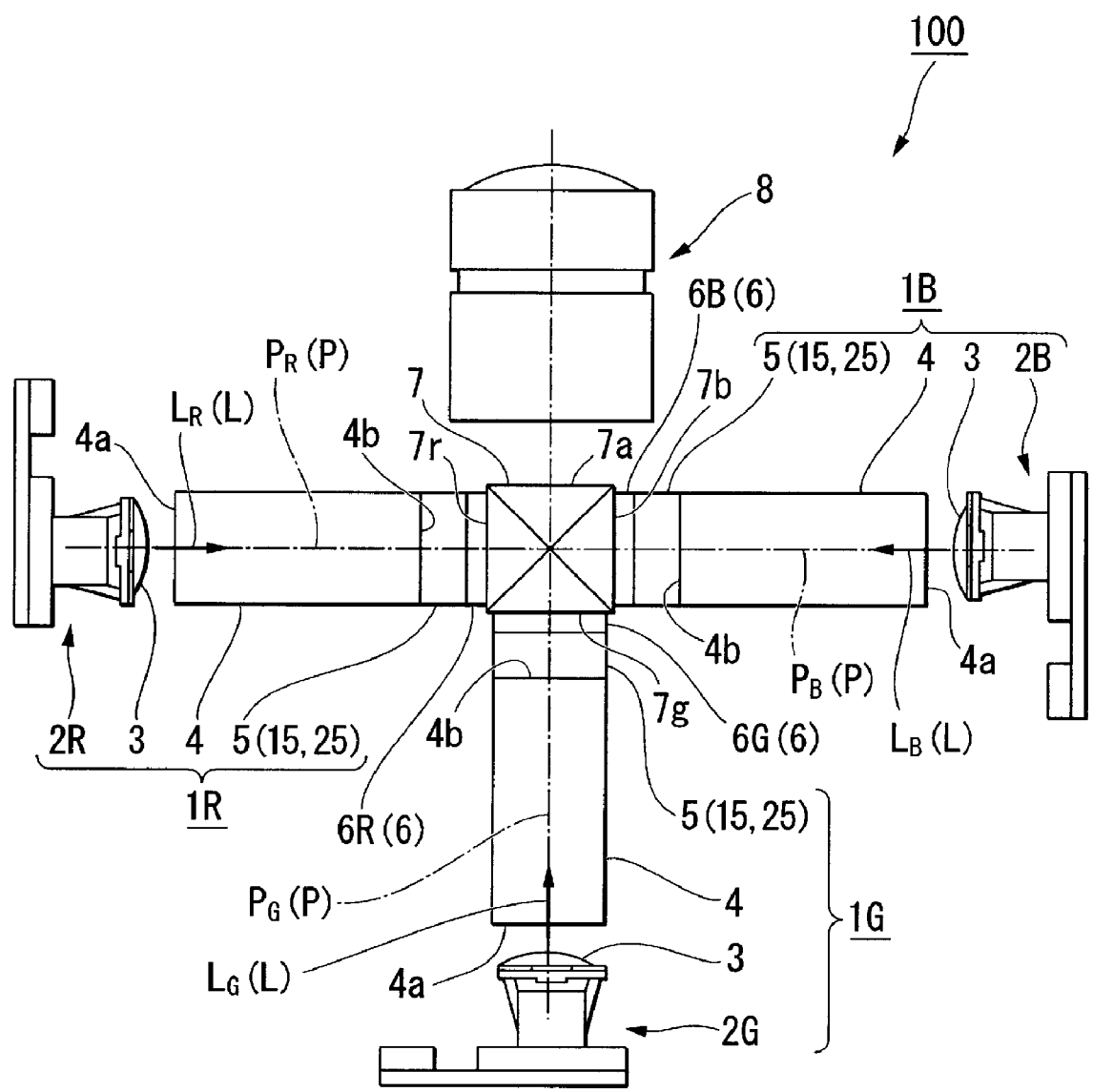
FIG. 1 is a front view of a liquid crystal projection apparatus according to an exemplary embodiment.

Various exemplary embodiments will now be described more fully with reference to the accompanying drawings in which some exemplary embodiments are shown.

Detailed illustrative exemplary embodiments are disclosed herein. However, specific structural and functional details disclosed herein are merely representative for purposes of describing exemplary embodiments. This invention may, however, may be embodied in many alternate forms and should not be construed as limited to only the exemplary embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention.

Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or," includes any and all combinations of one or more of the associated listed items.

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing exemplary embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, the thicknesses of layers and regions are exaggerated for clarity. Like reference numerals in the drawings denote like elements, and thus their description will be omitted. A liquid crystal projection apparatus including a polarization conversion optical system according to an embodiment of the present invention will be described as follows.

Figure 2A:
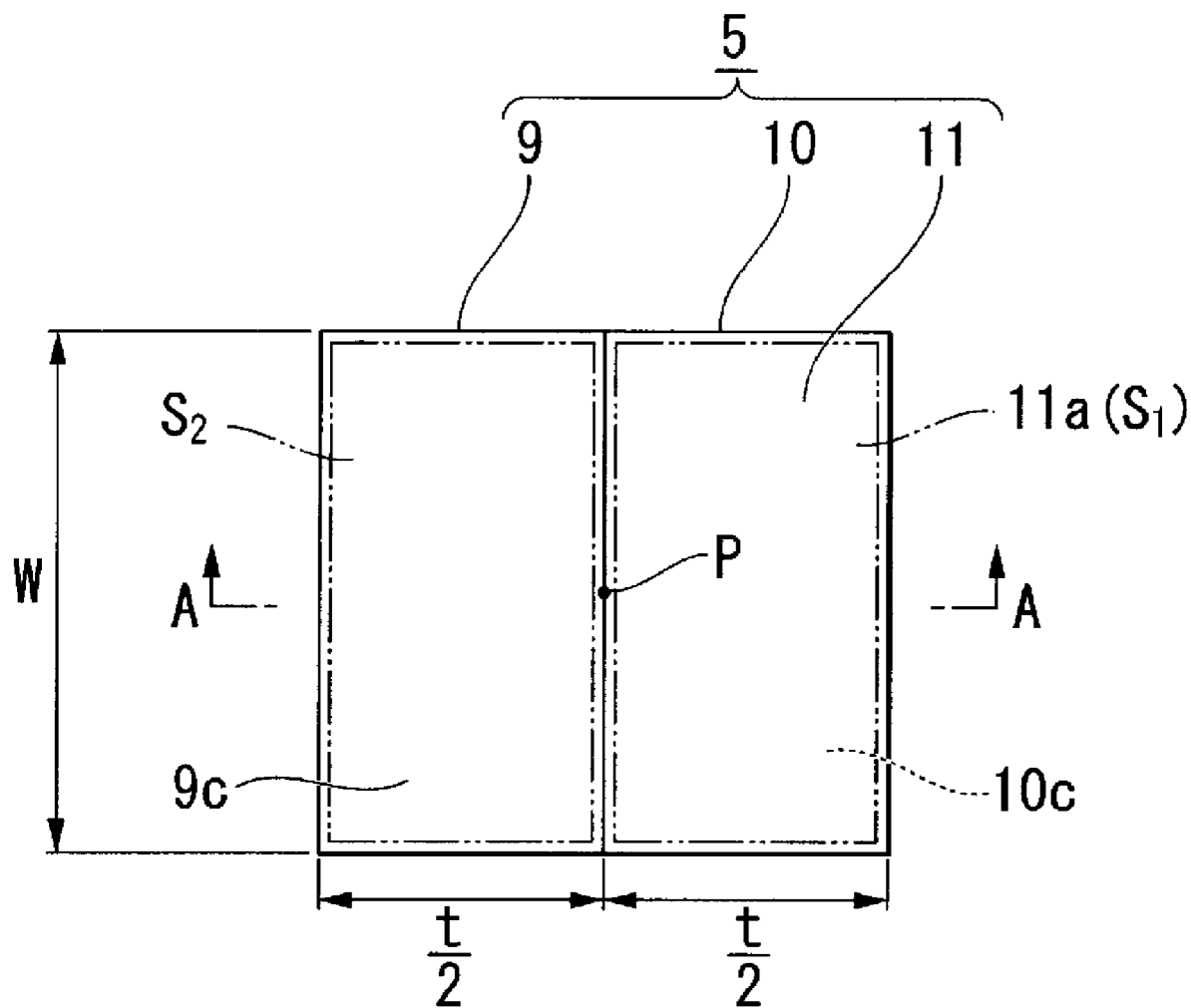
FIG. 2A is a plan view of a first polarization conversion optical system according to an exemplary embodiment.
Figure 2B:
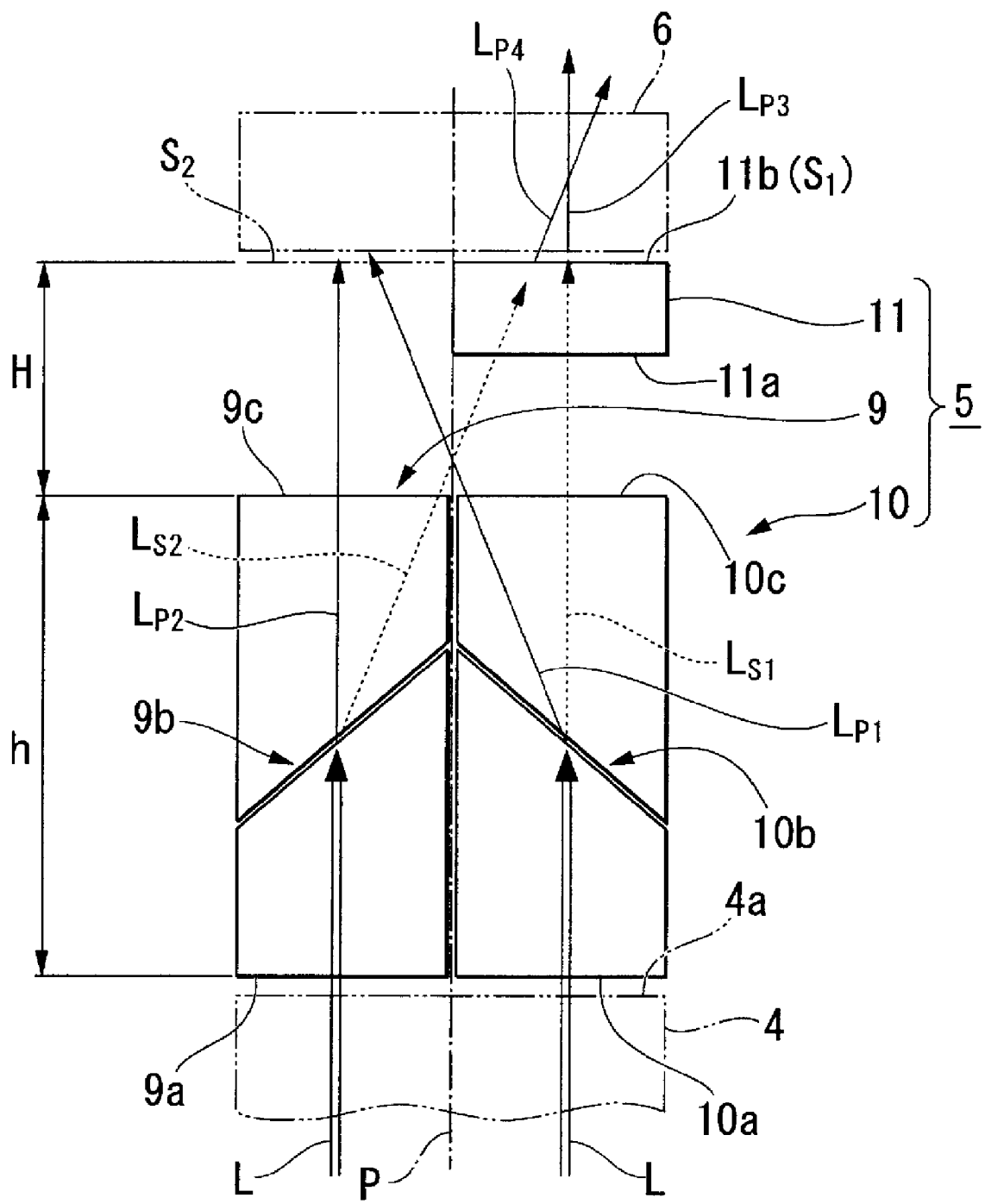
FIG. 2B is a cross-sectional view of the first polarization conversion optical system taken along line A-A of FIG. 2A.

FIG. 1 is a front view of a liquid crystal projection apparatus 100 according to the present exemplary embodiment. FIG. 2A is a plan view of a first polarization conversion optical system 5 according to an exemplary embodiment of the present invention, and FIG. 2B is a cross-sectional view of the first polarization conversion optical system 5 taken along line AA of FIG. 2A. Referring to FIG. 1, the liquid crystal projection apparatus 100 of the present embodiment irradiates a first illuminating flux $L_R$, a second illuminating flux $L_G$, and a third illuminating flux $L_B$, which respectively have red R, green G, and blue B wavelengths, to a first liquid crystal panel 6R, a second liquid crystal panel 6G, and a third liquid crystal panel 6B, respectively. In the first through third liquid crystal panels 6R, 6G, and 6B, polarized states of liquid crystal pixels (liquid crystal cells) are controlled in order to spatially modulate incident illuminating flux according to image signals respectively corresponding to R, G, and B colors. In addition, the liquid crystal projection apparatus 100 overlaps the illuminating fluxes which are spatially modulated in the first through third liquid crystal panels 6R, 6G, and 6B to locations of the fluxes that match each other, and then, projects the fluxes to a screen (not shown). The liquid crystal projection apparatus 100 may be applied to a projection television or a video projector.

The liquid crystal projection apparatus 100 includes a first illuminating portion 1R, a second illuminating portion 1G, and a third illuminating portion 1B, the first through third liquid crystal panels 6R, 6G, and 6B, a cross dichroic prism 7, and a projection lens 8. A controller (not shown) is electrically connected to each of the first through third liquid crystal panels 6R, 6G, and 6B, and the first through third illuminating portions 1R, 1G, and 1B. Thus, the controller may drive the first through third liquid crystal panels 6R, 6G, and 6B according to the image signals, or control lighting of the first through third illuminating portions 1R, 1G, and 1B.

The first illuminating portion 1R includes a red light emitting diode (LED) 2R that emits the first illuminating flux $L_R$, a condensing lens 3 that condenses the first illuminating flux $L_R$ emitted from the red LED 2R, a light tunnel 4 that equalizes an illuminance distribution (light intensity distribution) of the first illuminating flux $L_R$ which is condensed by the condensing lens 3, and a first polarization conversion optical system 5 that uniformly aligns a polarization direction of the first illuminating flux $L_R$, the illuminance distribution of which is equalized through the light tunnel 4.

The condensing lens 3 is disposed so that an optical axis of the condensing lens 3 is coaxial with a radiation central axis of light emitted from the red LED 2R. Therefore, the condensed status of the first illuminating flux $L_R$ emitted from the red LED 2R may vary by changing a distance between the condensing lens 3 and the red LED 2R.

The light tunnel 4 may be formed by forming a reflection surface on an inner surface of a cylinder having both ends open. However, a rod integrator in which the light incident from an end portion of the rod-shaped body is repeatedly totally internally reflected and guided to exit through the other end portion may be used as the light tunnel 4.

In the present embodiment, the light tunnel 4 is a rod integrator having a rectangular cross-section. An end portion of the light tunnel 4, that is, an incident cross-section 4a, faces the condensing lens 3, and the other end portion of the light tunnel 4, that is, an exit cross-section 4b, is adjacent to the first polarization conversion optical system 5. In addition, a central axis of the light tunnel 4 is coaxial with the optical axis of the condensing lens 3.

The exit cross-section 4b is a rectangular cross-section that is slightly larger than an effective pixel region of the first liquid crystal panel 6R. For example, if the effective pixel region of the first liquid crystal panel 6R is a rectangular cross-section of a size of a longer side width W×a shorter side width D (W>D), the exit cross-section 4b is a rectangular cross-section of a size of a longer side width W+ΔW×a shorter side width D+ΔD(ΔW≧0, ΔD≧0).

Due to the above structure, the first illuminating flux $L_R$ emitted from the red LED 2R becomes rectangular flux, the illuminance distribution of which is equalized by the condensing lens 3 and the light tunnel 4. In addition, the rectangular flux exits along a central axis of the exit cross-section 4b. The first illuminating flux $L_R$ has a central axis which is a first optical axis $P_R$ of the first illuminating portion 1R.

The second and third illuminating portions 1G and 1B respectively include a green LED 2G that emits the second illuminating flux $L_G$, and a blue LED 2B that emits the blue third illuminating flux $L_B$.

Central axes of the second and third illuminating fluxes $L_G$ and $L_B$ that exit from corresponding exit cross-sections 4b of corresponding light tunnels 4 are respectively a second optical axis $P_G$ of the second illuminating portion 1G and a third optical axis $P_B$ of the third illuminating portion 1B.

Next, first polarization conversion optical systems 5 of the first through third illuminating portions 1R, 1G, and 1B will be described as follows.

The first polarization conversion optical systems 5 are respectively disposed in the first through third illuminating portions 1R, 1G, and 1B, and the relative locations of the first polarization conversion optical systems 5 with respect to the exit cross-sections 4b, the first through third optical axes $P_R$, $P_G$, and $P_B$, and the first through third liquid crystal panels 6R, 6G, and 6B are the same as each other. Hereinafter, an illuminating portion may be denoted by reference numeral 1, an optical axis may be denoted by reference letter P, a bundle of illuminating rays may be denoted by reference letter L, and a liquid crystal panel may be denoted by reference numeral 6 without including references for colors R, G, and B, because the above components obviously vary depending on wavelengths.

The first polarization conversion optical system 5 includes a Rochon prism 9, a Senarmont prism 10, and a half-wave plate 11, which are supported corresponding to each other by a supporting member (not shown), as shown in FIGS. 2A and 2B.

The Rochon prism 9 and the Senarmont prism 10 are formed as a rectangular parallelepiped having a size of height (h)×width (w)×thickness (t/2), respectively. The Rochon prism 9 and the Senarmont prism 10 are arranged in parallel in a state of facing each other in a width direction. Therefore, the parallel body of the Rochon prism 9 and the Senarmont prism 10 is formed as a rectangular parallelepiped having a size of a height (h)×width (w)×thickness (t).

Here, the rectangle of w×t has an area equal to that of the rectangle of W×D in the effective pixel region of the liquid crystal panel 6 or greater. In addition, the area of the rectangle w×t is equal to the area (W+ΔW)×(D+ΔD) of the exit cross-section 4b of the light tunnel 4 or less. Any one of the width w and the thickness t may be greater than the other. That is, the thickness of the rectangular parallelepiped may be disposed on the longer side of the liquid crystal panel 6 or the shorter side of the liquid crystal panel 6.

Surfaces of the Rochon prism 9 and the Senarmont prism 10 are referred to as first and second incident prism surfaces 9a and 10a, and the other surfaces of the Rochon prism 9 and the Senarmont prism 10 are referred to as first and second exit prism surfaces 9c and 10c, respectively. The first and second incident prism surfaces 9a and 10a face the exit cross-section 4b of the light tunnel 4 closely in the optical axis P direction.

Therefore, the rectangular parallelepiped formed by the Rochon prism 9 and the Senarmont prism 10 is disposed so that the optical axis P passes through central portions of the rectangle formed by the first and second incident prism surfaces 9a and 10a and the rectangle formed by the first and second exit prism surfaces 9c and 10c.

The Rochon prism 9 is formed by bonding two prisms, each of which is formed with a uniaxial crystal such as calcite, having the same apex angles as each other so that optical axes of the two prisms may be perpendicular to each other. Therefore, as shown in FIG. 2B, a first polarization splitting surface 9b which is a bonding surface of the two prisms and is inclined with respect to the height h of the rectangular parallelepiped is formed between the first incident prism surface 9a and the first exit prism surface 9c. The first polarization splitting surface 9b is inclined so that the acute apex angle of the prism, which is located on a side of the first incident prism surface 9a, is located at a side facing the Senarmont prism 10.

Due to the above structure, a second P-polarized flux $L_{P2}$, which is a P-polarized component with respect to the first polarization splitting surface 9b in the illuminating flux L incident on the first incident prism surface 9a along the optical axis P, proceeds straightly toward the first exit prism surface 9c, and at the same time, a second S-polarized flux $L_{S2}$, which is an S-polarized component with respect to the first polarization splitting surface 9b, is inclined toward the Senarmont prism 10 slightly tilted with respect to the optical axis P.

The Senarmont prism 10 may be formed by closely disposing two prisms having the same apex angles as each other with an air gap between the two prisms to form a rectangle. Of the two prisms, the prism located on a side of the second incident prism surface 10a may be formed of glass, and the other prism located on the side of the second exit prism surface 10c may be formed of a uniaxial crystal material such as the calcite. Thus, as shown in FIG. 2B, a second polarization splitting surface 10b, which is a uniaxial crystal prism surface inclined with respect to the height h of the rectangular parallelepiped, is formed between the second incident prism surface 10a and the second exit prism surface 10c. The second polarization splitting surface 10b is inclined so that the acute apex angle of the prism located on the side of the second incident prism surface 10a is located at a side facing the Rochon prism 9.

Due to the above structure, a first S-polarized flux $L_{S1}$ which is the S-polarized component with respect to the second polarization splitting surface 10b in the illuminating flux L incident on the second incident prism surface 10a along the optical axis P proceeds straight toward the second exit prism surface 10c, and at the same time, a first P-polarized flux $L_{P1}$, which is a P-polarized component with respect to the second polarization splitting surface 10b, is inclined toward the Rochon prism 9 slightly tilted with respect to the optical axis P.

The inclination directions of the second S-polarized flux $L_{S2}$ and the first P-polarized flux $L_{P1}$ at the first and second polarization splitting surfaces 9b and 10b are planar-symmetric with about facing surfaces of the Rochon prism 9 and the Senarmont prism 10, through which the optical axis P passes.

The half-wave plate 11 changes the polarization direction of the flux transmitting in a thickness direction thereof by 90°. In the present embodiment, the first S-polarized flux $L_{S1}$, which is straightly incident on the half-wave plate 11 from the second exit prism surface 10c, and the second S-polarized flux $L_{S2}$, which is inclinedly incident on the half-wave plate 11 from the first exit prism surface 9c, are changed to third and fourth P-polarized fluxes $L_{P3}$ and $L_{P4}$ by the half-wave plate 11.

In addition, the half-wave plate 11 is fabricated according to the wavelength of the flux that transmits through the half-wave plate 11.

The half-wave plate 11 is formed as a rectangle of a size w×t/2, and is adjacent to the liquid crystal panel 6 and faces the second exit prism surface 10c.

The surface of the half-wave plate 11 facing the second exit prism surface 10c is an incident surface 11a and the surface of the half-wave plate 11 facing the liquid crystal panel 6 is an exit surface 11b. Also, the incident surface 11a and the second exit prism surface 10c are separated from each other in the optical axis P direction, and the exit surface 11b is separated by a distance H from the second exit prism surface 10c.

Here, the distance H is greater than the thickness of the half-wave plate 11. In addition, the distance H is set so that the second S-polarized flux $L_{S2}$ may transmit through the half-wave plate 11 according to the exit angle of the second S-polarized flux $L_{S2}$ that is emitted from the first exit prism surface 9c of the Rochon prism 9.

The effective pixel region of the liquid crystal panel 6 overlaps with the rectangle of w×$t_{formed}$ by the first and second exit prism surfaces 9c and 10c, and the liquid crystal panel 6 is adjacent to the exit surface 11b of the half-wave plate 11 in the optical axis P direction.

Thus, the effective pixel region of the liquid crystal panel 6 is illuminated by the third and fourth P-polarized fluxes $L_{P3}$ and $L_{P4}$ which are emitted from the exit surface 11b (also referred to as a first region $S_1$) of the half-wave plate 11 and the first and second P-polarized fluxes $L_{P1}$ and $L_{P2}$ that transmit through a second region $S_2$ which is a part of the rectangle of w×t/2 at the same plane as the exit surface 11b and faces the first exit prism surface 9c.

The first region $S_1$ and the second region $S_2$ form a light emitting portion through which the illuminating flux L incident into the first and second incident prism surfaces 9a and 10a transmits the first polarization conversion optical system 5 and has the same light emitting area as the sum of the area of the first and second incident prism surfaces 9a and 10a.

The cross-dichroic prism 7 is a rectangular photo-coupling device which is formed by bonding four triangle prisms to form wavelength-splitting surfaces according to the wavelength of the incident flux on the bonding surfaces. In the present embodiment, as shown in FIG. 1, red, green, and blue fluxes incident on first through third prism surfaces 7r, 7g, and 7b are mixed and emitted through an exit prism surface 7a which faces the second incident prism surface 7g.

The first through third liquid crystal panels 6R, 6G, and 6B are disposed respectively on the first through third incident prism surfaces 7r, 7g, and 7b at positions where the optical distances from the exit prism surface 7a to the first through third liquid crystal panels 6R, 6G, and 6B are the same as each other.

Therefore, the first through third optical axes $P_R$, $P_G$, and $P_B$ are disposed along normal lines of the first through third incident prism surfaces 7r, 7g, and 7b. In addition, an optical axis of the mixed fluxes emitted from the exit prism surface 7a is coaxial with the second optical axis $P_G$.

The projection lens 8 is a projecting optical system enlarging and projecting images of the first through third liquid crystal panels 6R, 6G, and 6B, which are mixed by the cross-dichroic prism 7, onto a screen (not shown). The projection lens 8 faces the exit prism surface 7a of the cross-dichroic prism 7 and an optical axis of the projection lens 8 is coaxial with the second optical axis $P_G$.

Next, the operations of the liquid crystal projection apparatus 100 will be described based on the operations of the first polarization conversion optical system 5. The reference letters R, G, and B representing colors may be omitted since the operations may be performed regardless of flux color.

As shown in FIG. 1, the first illuminating flux $L_R$ emitted from the red LED 2R is concentrated by the condensing lens 3 and then is incident on the incident cross-section 4a of the light tunnel 4.

The first illuminating flux $L_R$ is the illuminating flux L (refer to FIG. 2B), the polarization direction and the luminance distribution of which are equalized by being internal-reflected in the light tunnel 4, and is emitted from the exit cross-section 4b along the first optical axis $P_R$.

As shown in FIG. 2B, the first and second incident prism surfaces 9a and 10a of the first polarization conversion optical system 5 closely face the exit cross-section 4b, and the illuminating flux L emitted from the exit cross-section 4b is incident on the first polarization conversion optical system 5 through the two incident regions of the first and second incident prism surfaces 9a and 10a.

When the illuminating flux L incident through the second incident prism surface 10a reaches the second polarization splitting surface 10b, the polarization direction of the illuminating flux L is divided into the first S-polarized flux $L_{S1}$, which proceeds straight and is emitted through the second exit prism surface 10c, and the first P-polarized flux $L_{P1}$, which deviates toward the Rochon prism 9 in a direction inclined with respect to the optical axis P and then is emitted through the second exit prism surface 10c.

After that, the first S-polarized flux $L_{S1}$ is incident on the incident surface 11a of the half-wave plate 11, and is emitted as the third P-polarized flux $L_{P3}$, the polarization direction of which is converted by 90°, from the exit surface 11b, that is, the first region $S_1$, toward the liquid crystal panel 6.

The first P-polarized flux $L_{P1}$ proceeds at an angle in the space separated by the distance H between the second exit prism surface 10c and the liquid crystal panel 6, and then, is emitted toward the liquid crystal panel 6 through the second region $S_2$.

When the illuminating flux L incident through the first incident prism surface 9a reaches the first polarization splitting surface 9b, polarization direction of the illuminating flux L is divided into the second P-polarized flux $L_{P2}$ which proceeds straight and emitted through the first exit prism surface 9c and the second S-polarized flux $L_{S2}$, which deviates in a direction inclined with respect to the optical axis P toward the Senarmont prism 10 and then is emitted through the first exit prism surface 9c.

Meanwhile, the second P-polarized flux $L_{P2}$ proceeds straight in the space separated by the distance H between the first exit prism surface 9c and the liquid crystal panel 6, and then, is emitted toward the liquid crystal panel 6 through the second region $S_2$.

The second S-polarized flux $L_{S2}$ proceeds at an angle in the space between the first exit prism surface 9c and the liquid crystal panel 6 incident into the incident surface 11a of the half-wave plate 11, and then, is emitted as the fourth P-polarized flux $L_{P4}$, the polarization direction of which is converted by 90°, from the exit surface 11b, that is, the first region $S_1$, toward the liquid crystal panel 6.

As described above, in the present embodiment, the S-polarized components in the illuminating flux L incident through different incident regions, that is, the first and second incident prism surfaces 9a and 10a, commonly transmit through the first region $S_1$. In addition, the P-polarized components in the illuminating flux L incident through different incident regions, that is, the first and second incident prism surfaces 9a and 10a, commonly transmit through the second region $S_2$.

Therefore, the illuminating flux L incident on the first and second incident prism surfaces 9a and 10a is incident on the liquid crystal panel 6 as the first through fourth P-polarized fluxes $L_{P1}$, $L_{P2}$, $L_{P3}$, and $L_{P4}$.

Since the illuminating flux L is not parallel light, there may be S-polarized flux which is not incident on the half-wave plate 11 or P-polarized flux converted into the S-polarized flux after being incident on the half-wave plate 11 due to the incident angle of the illuminating flux L into the first and second incident prism surfaces 9a and 10a. However, almost all of the illuminating flux L may be converted into the P-polarized flux by appropriately adjusting the inclination angles of the first and second polarization splitting surfaces 9b and 10b, locations of the first and second polarization splitting surfaces 9b and 10b, and locations of the first and second regions $S_1$ and $S_2$.

In the liquid crystal panel 6, a control voltage applied to the liquid crystal pixels may vary according to image signals for changing the polarized states of the liquid crystal pixels and for controlling a quantity of transmission of the P-polarized flux. Since the illuminating flux L is incident on the liquid crystal panel 6 after most of the flux is converted into the P-polarized flux by the first polarization conversion optical system 5, an excellent extinction ratio may be obtained. In addition, since most of the illuminating flux L is used as the P-polarized flux, a light utilizing efficiency may be improved.

The first illuminating flux $L_R$ that transmits through the first liquid crystal panel 6R is spatially modulated by the first liquid crystal panel 6R, and then, is incident on the first incident prism surface 7r of the cross-dichroic prism 7.

The second and third illuminating fluxes $L_G$ and $L_B$ emitted from the green LED 2G and the blue LED 2B of the second and third illuminating portions 1G and 1B are spatially modulated by the second and third liquid crystal panels 6G and 6B, and then, are incident on the second and third incident prism surfaces 7g and 7b of the cross-dichroic prism 7 in the same manner as above, respectively.

The illuminating fluxes of R, G, and B colors incident in the cross-dichroic prism 7 are mixed with each other in such a way that pixel arrangements of the illuminating fluxes correspond to each other, and then, emitted through the exit prism surface 7a.

The flux mixed by the cross-dichroic prism 7 is transmitted through the projection lens 8 to be enlarged and projected onto the screen (not shown). Therefore, a full-color image, according to the image signals applied to the first through third liquid crystal panels 6R, 6G, and 6B, is projected on the screen.

According to the liquid crystal projection apparatus 100 of the present embodiment, the first polarization conversion optical system 5 is formed of the combination of the second polarization splitting surface 10b of the Senarmont prism 10, which makes the S-polarized component proceed straight and deviates the P-polarized component in the inclined direction, and the first polarization splitting surface 9b of the Rochon prism 9, which makes the P-polarized component proceed straight and deviates the S-polarized component in the inclined direction. Therefore, the polarization direction of the illuminating flux L incident in the first and second incident prism surfaces 9a and 10a is divided to proceed into the first and second regions $S_1$ and $S_2$, and the S-polarized component in the first region $S_1$ is converted to the P-polarized component. Thus, the polarization direction of the illuminating flux L may be aligned without a loss of light quantity.

In addition, since the first and second regions $S_1$ and $S_2$ respectively emit the same polarized components of the incident lights incident through different incident regions, the sum of the areas of the first and second incident prism surfaces 9a and 10a is the same as the sum of the areas of the first and second regions $S_1$ and $S_2$, and the luminance distribution of the illuminating flux may be equalized.

Therefore, the first polarization conversion optical system 5 may emit the flux, the polarization direction of which is aligned, without enlarging the diameter of the illuminating flux L. In addition, the condensing lens that is required to reduce the diameter of the flux in the conventional polarization conversion optical system may be omitted, and thus, a simple structure may be realized.

Hereinafter, a polarization conversion optical system according to another exemplary embodiment of the present invention will be described as follows.

Figure 3:
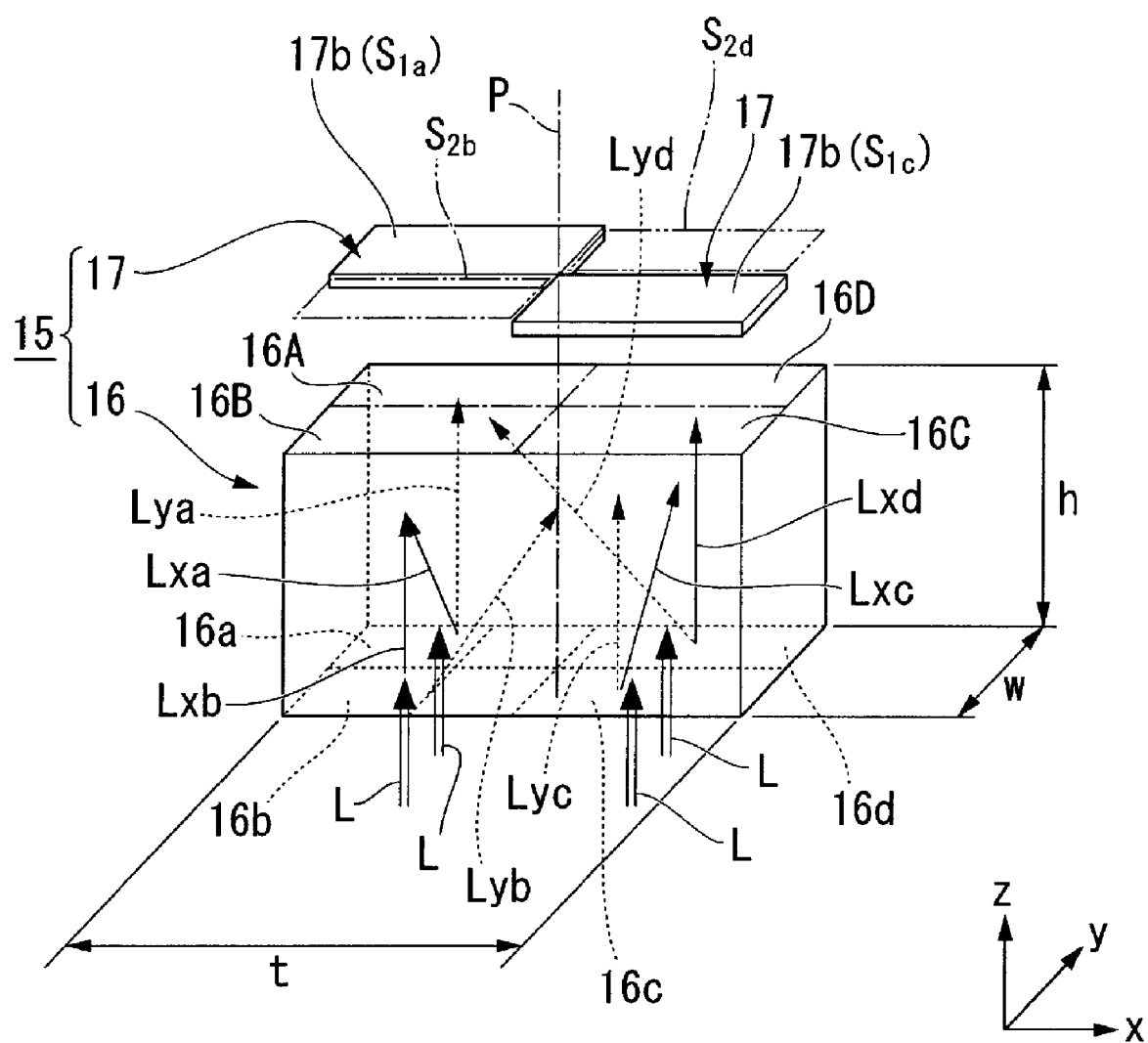
FIG. 3 is a perspective view of a second polarization conversion optical system according to another exemplary embodiment.
Figure 4A:
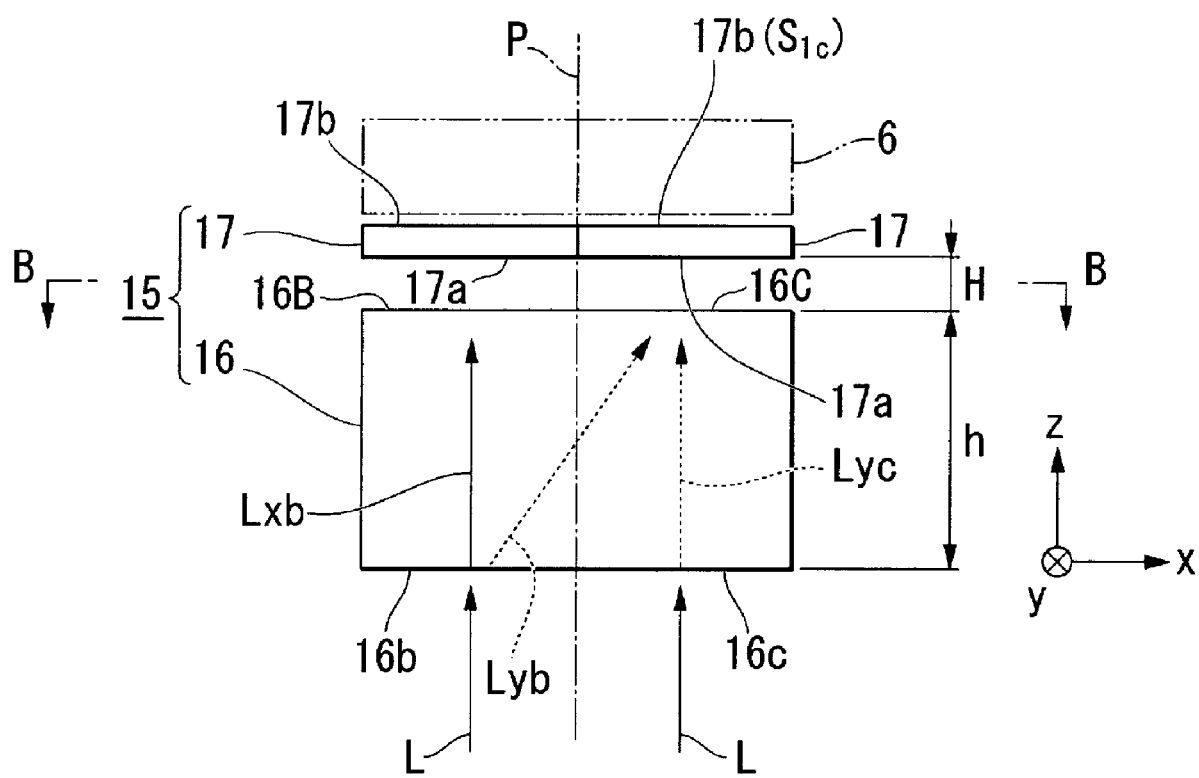
FIG. 4A is a front view of the second polarization conversion optical system seen from a y-direction of FIG. 3.
Figure 4B:
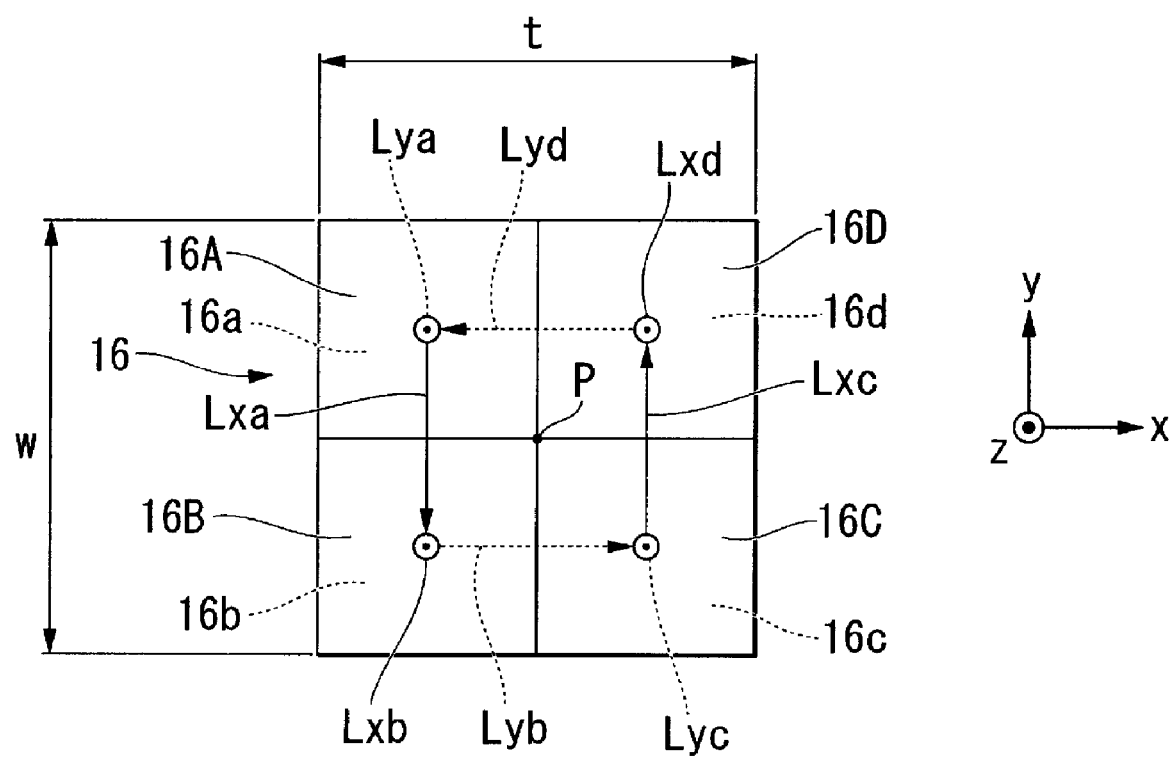
FIG. 4B is a cross-sectional view of the second polarization conversion optical system taken along line B-B of FIG. 3.

FIG. 3 is a perspective view of a second polarization conversion optical system 15 according to another exemplary embodiment of the present invention. FIG. 4A is a front view of the polarization conversion optical system 15 seen from a y-direction, and FIG. 4B is a cross-sectional view of the polarization conversion optical system 15 taken along line B-B of FIG. 4A.

In the above drawings, the x-y-z coordinate system is denoted as a reference for directions. The z-axis is the direction parallel with the optical axis P, that is, a positive direction of the z-axis is from the light tunnel 4 to the liquid crystal panel 6 in the liquid crystal projection apparatus 100. An x-y plane is a plane which is perpendicular to the z-axis, and the x-axis is the thickness t direction of the first polarization conversion optical system 5. A positive direction of the x-axis is from the Rochon prism 9 to the Senarmont prism 10 in the first polarization conversion optical system 5 of the above embodiment or from polarization hologram surfaces 16a and 16b to polarization hologram surfaces 16c and 16d, as discussed below.

According to the x-y-z coordinate system, the S-polarization direction in the first polarization conversion optical system 5 corresponds to the y-axis direction, and the P-polarization direction corresponds to the x-axis direction. Hereinafter, the polarization direction in the y-axis direction will be referred to as y-axis polarization direction, and the polarization direction in the x-axis direction will be referred to as x-axis polarization direction, wherein the y-axis polarization direction and the x-axis polarization direction are perpendicular to each other.

Referring to FIG. 3, the second polarization conversion optical system 15 of the present embodiment may be substituted for the first polarization conversion optical system 5 in the liquid crystal projection apparatus 100 according to the previous embodiment (FIG. 1). The second polarization conversion optical system 15 is a polarization conversion optical system using a polarization hologram instead of using polarization prisms as in the previous embodiment.

As shown in FIGS. 3, 4A, and 4B, the second polarization conversion optical system 15 includes a polarization hologram device 16 and a half-wave plate 17, which are supported by a supporting member (not shown) in such a way that the positions of the polarization hologram device 16 and the half-wave plate 17 correspond to each other.

The polarization hologram device 16 is a rectangular parallelepiped formed of glass, having a size of w(width in the y-axis)×t(thickness in the x-axis)×h(height in the z-axis). Then, a lower surface (w×t) of the polarization hologram device 16 is divided into four light incident regions, each having a size of w/2×t/2, to form first to fourth polarization hologram surfaces 16a, 16b, 16c, and 16d.

The second and first polarization hologram surfaces 16b and 16a are disposed in that order in the positive direction of the y-axis, the fourth polarization hologram surface 16d is adjacent to the first polarization hologram surface 16a in the x-axis direction and the third polarization hologram surface 16c is adjacent to the second polarization hologram surface 16b in the x-axis direction.

Hereinafter, regions corresponding to the first through fourth polarization hologram surfaces 16a to 16d in a surface opposite to the lower surface of the polarization hologram device 16 are referred to as first through fourth exit regions 16A, 16B, 16C, and 16D.

In the illuminating flux L incident along an optical axis P, a first y-axis polarized flux $L_{ya}$ proceeds straight through the first polarization hologram surface 16a and exits through the first exit region 16A, and at the same time, a first x-axis polarized flux $L_{xa}$ is deviated with respect to the optical axis P from the positive direction to the negative direction of the y-axis and exits through the second exit region 16B or the first exit region 16A.

In addition, in the illuminating flux L incident along the optical axis P, a second x-axis polarized flux $L_{xb}$ proceeds straight through the second polarization hologram surface 16b and exits through the second exit region 16B, and at the same time, a second y-axis polarized flux $L_{yb}$ is deviated with respect to the optical axis P from the negative direction to the positive direction of the x-axis on an x-z plane and exits through the third exit region 16C or the second exit region 16B. In the illuminating flux L incident along the optical axis P, a third y-axis polarized flux $L_{yc}$ proceeds straight through the third polarization hologram surface 16c and exits through the third exit region 16C, and at the same time, a third x-axis polarized flux $L_{xc}$ is deviated with respect to the optical axis P from the negative direction to the positive direction of the y-axis on a y-z plane and exits through the fourth exit region 16D or the third exit region 16C.

In the illuminating flux L incident along the optical axis P, a fourth x-axis polarized flux $L_{xd}$ proceeds straight through the fourth polarization hologram surface 16d and exits through the fourth exit region 16D, and at the same time, a fourth y-axis polarized flux $L_{yd}$ is deviated with respect to the optical axis P from the positive direction to the negative direction of the x-axis direction on the x-z plane and exits through the first exit region 16A or the fourth exit region 16D.

The deviation angles on the polarization hologram surfaces may be set, as follows, according to the wavelength of the illuminating flux L.

The first y-axis polarized flux $L_{ya}$ and the fourth y-axis polarized flux $L_{yd}$ reach a first region $S_{1a}$, which is a rectangular area facing the first exit region 16A and separated from the first exit region 16A by a distance H along the z-axis direction.

The second x-axis polarized flux $L_b$ and the first x-axis polarized flux $L_{xa}$ reach a second region $S_{2b}$, which is a rectangular area facing the second exit region 16B and is separated from the second exit region 16B by the distance H along the z-axis direction. The third y-axis polarized flux and the second y-axis polarized flux $L_{yb}$ reach a first region $S_{1c}$, which is a rectangular area facing the third exit region 16C and is separated from the third exit region 16C by the distance H along the z-axis direction.

The fourth x-axis polarized flux $L_{xd}$ and the third x-axis polarized flux $L_{xc}$, reach a second region $S_{2d}$ which is a rectangular area facing the fourth exit region 16D and is separated from the fourth exit region 16D by the distance H along the z-axis direction.

Here, the distance H is greater than a thickness of the half-wave plate 17 which will be described later.

The first regions $S_{1a}$ and $S_{1c}$, and second regions $S_{2b}$ and $S_{2d}$ are rectangles each having a size of w/2×t/2. In addition, the first regions $S_{1a}$ and $S_{1c}$, and the second regions $S_{2b}$ and $S_{2d}$ form the light exiting portion of the second polarization conversion optical system 15.

The half-wave plate 17 changes the polarization direction of the flux that is transmitted in the thickness direction thereof by 90°. In the present embodiment, the half-wave plate 17 is formed of two a rectangular half-wave plates, each having a size of w/2×t/2. In addition, the two of the half-wave plates 17 are disposed so that incident surfaces 17a correspond to the first and third exit regions 16A and 16C and exit surfaces 17b correspond to the first regions $S_{1a}$ and $S_{1c}$.

Next, the operations of the second polarization conversion optical system 15 will be described as follows.

When the second polarization system 15 is disposed in the liquid crystal projection apparatus 100 instead of using the first polarization conversion optical system 5, the illuminating flux, the polarization direction and the luminance distribution of which are equalized by the light tunnel 4, exits through the exit cross-sectional surface 4b along the optical axis P.

For example, as shown in FIG. 4A, when the illuminating flux L is incident on the second polarization hologram surface 16b, the polarization direction of the flux L is divided into the second x-axis polarized flux $L_{xb}$, which proceeds straight through the second polarization hologram surface 16b toward the second exit region 16B and reaches the second region $S_{2b}$, and the second y-axis polarized flux $L_{yb}$, which deviates with respect to the optical axis P from the negative direction to the positive direction of the x-axis on an x-z plane and reaches the first region $S_{1c}$.

Likewise, the polarization direction of the flux L is divided at each of the polarization hologram surfaces in the above described directions.

Therefore, the first y-axis polarized flux $L_{ya}$ emitted from the first polarization hologram surface 16a and the fourth y-axis polarized flux $L_{yd}$ emitted from the fourth polarization hologram surface 16d reach the first region $S_{1a}$, and the above fluxes are converted to the x-axis polarized fluxes by the half-wave plate 17 disposed on the first region $S_{1a}$ and emitted toward the liquid crystal panel 6 from the exit surface 17b. In addition, the third y-axis polarized flux $L_{yc}$ emitted from the third polarization hologram surface 16c and the second y-axis polarized flux $L_{yb}$ emitted from the second polarization hologram surface 16b reach the first region $S_{1c}$, and the above fluxes are converted to the x-axis polarized fluxes by the half-wave plate 17 disposed on the first region $S_1$, and emitted toward the liquid crystal panel 6 from the exit surface 17b.

In addition, the second x-axis polarized flux $L_{xb}$ emitted from the second polarization hologram surface 16b and the first x-axis polarized flux $L_{xa}$ emitted from the first polarization hologram surface 16a reach the second region $S_{2b}$, and the above fluxes are emitted toward the liquid crystal panel 6 through the second region $S_{2b}$.

In addition, the fourth x-axis polarized flux $L_{xd}$ emitted from the fourth polarization hologram surface 16d and the third x-axis polarized flux $L_{xc}$ emitted from the third polarization hologram surface 16c reach the second region $S_{2d}$, and the above fluxes are emitted toward the liquid crystal panel 6 through the second region $S_{2d}$.

According to the present embodiment, the second polarization conversion optical system 15 includes the first through fourth polarization hologram surfaces 16a, 16b, 16c, and 16d, which divide the light incident surface into four incident regions. At the same time, the illuminating flux L is divided into fluxes toward the first regions $S_{1a}$ and $S_{1c}$ and the second regions $S_{2b}$ and $S_{2d}$ according to the polarization direction. Then, the y-axis polarized flux toward the first regions $S_{1a}$ and $S_{1c}$ is converted into the x-axis polarized flux, and accordingly, the polarization direction may be aligned without loss of light quantity.

In addition, the first regions $S_{1a}$, $S_{1c}$ and the second regions $S_{2b}$ and $S_{2d}$ respectively emit the same polarized components of the fluxes incident through different incident regions, the sum of the areas of the first through fourth polarization hologram surfaces 16a, 16b, 16c, and 16d is the same as the sum of the areas of the first regions $S_{1a}$, $S_1$, and the second regions $S_{2b}$ and $S_{2d}$, and the luminance distribution of the illuminating flux may be equalized.

Therefore, the second polarization conversion optical system 15 may emit the flux, the polarization direction of which is aligned, without enlarging the diameter of the illuminating flux L. In addition, a condensing lens that is required to reduce the diameter of the flux in the conventional polarization conversion optical system may be omitted, and thus, a simple structure may be realized.

In addition, in the polarization hologram device 16, four polarization splitting surfaces are integrated, and accordingly, the structure of the second polarization system 15 may be simpler than the first polarization conversion optical system 5 including a plurality of prisms.

Hereinafter, a polarization conversion optical system according to another exemplary embodiment of the present invention will be described as follows.

Figure 5:
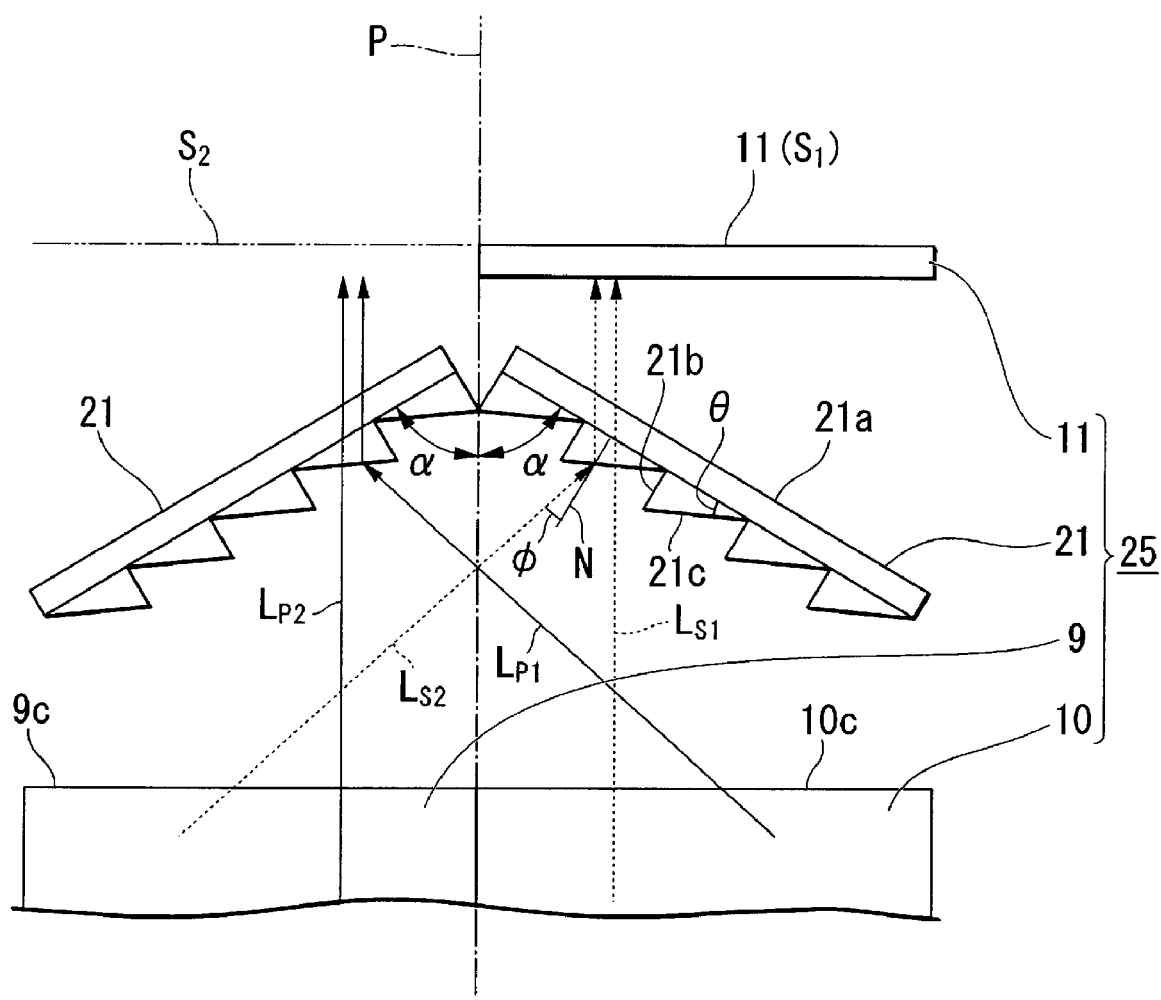
FIG. 5 is an enlarged diagram of a third polarization conversion optical system according to another exemplary embodiment.

FIG. 5 is an enlarged cross-sectional view of a third polarization conversion optical system 25 according to another exemplary embodiment of the present invention.

As shown in FIG. 5, the third polarization conversion optical system 25 may be substituted for the first polarization conversion optical system 5 in the liquid crystal projection apparatus 100. The third polarization conversion optical system 25 is an example of a polarization conversion optical system including blazed gratings.

As shown in FIG. 5, the third polarization conversion optical system 25 is formed by installing a pair of blazed gratings 21 to the first polarization conversion optical system 5 of the previous embodiment above. Hereinafter, components of the third polarization conversion optical system 25 which are different from those of the first polarization conversion optical system 5 will be described.

The blazed grating 21 is a transmissive diffraction grating in which a saw-toothed grating recess 21*b* is formed on a surface of a substrate 21*a*, wherein the saw-toothed grating recess 21*b* includes triangles each having an inclination surface 21*c* that is inclined with respect to the surface of the substrate 21*a* by an angle θ and repeatedly disposed on the surface of the substrate 21*a*.

In the pair of blazed gratings 21, one of the blazed gratings 21 between the second exit prism surface 10*c* and the half-wave plate 11 is inclined with respect to the optical axis P at an angle α. The cross-sectional shape of the grating recess 21*b* is formed so that a second S-polarized flux $L_{S2}$ emitted from the first exit prism surface 9*c* is diffracted at the highest diffraction efficiency, and at the same time, a first S-polarized flux $L_{S1}$ proceeding straight from the second exit prism surface 10*c* may proceed without being affected by diffraction.

For example, an incident angle φ of the second S-polarized flux $L_{S2}$ with respect to a normal N of the blazed grating 21 may be set close to 0°, and then, the angle θ may be set nearly perpendicular to the optical axis P (90°−α).

The other blazed grating 21 is symmetrical with the above blazed grating 21 about the facing surface between Rochon prism 9 and Sernamont prism 10 including the optical axis P, and is located between the first exit prism surface 9*c* and the second region $S_2$. That is, the other blazed grating 21 is disposed so that a first P-polarized flux $L_{P1}$ emitted from the second exit prism surface 10*c* may be diffracted at the highest diffraction efficiency along the optical axis P and at the same time, the second P-polarized flux $L_{P2}$ proceeding straight from the first exit prism surface 9*c* may proceed without being affected by diffraction.

According to the third polarization conversion optical system 25, the pair of the blazed gratings 21 is disposed, and the first S-polarized flux $L_{S1}$ and the second P-polarized flux $L_{P2}$ may proceed straight through the blazed gratings 21 without being diffracted by the blazed gratings 21, and then, reach the first and second regions $S_1$ and $S_2$.

The first P-polarized flux $L_{P1}$ and the second S-polarized flux $L_{S2}$ are diffracted toward the optical axis P by the blazed gratings 21, and reach the first and second regions $S_1$ and $S_2$.

Here, since the first P-polarized flux $L_{P1}$ and the second S-polarized flux $L_{S2}$ are not the parallel fluxes, the incident angle φ is not uniform, however, the above fluxes are diffracted toward the optical axis P by the blazed gratings 21. Therefore, the inclination angle of the fluxes with respect to the optical axis P is less than that of the case where there are no blazed gratings 21, and the fluxes reach the first and second regions $S_1$ and $S_2$.

The first and second S-polarized fluxes $L_{S1}$ and $L_{S2}$ that reach the first region $S_1$ are converted into P-polarized fluxes by the half-wave plate 11 like in the first polarization conversion optical system 5, and accordingly, the illuminating flux L, the polarization direction of which is aligned as the P-polarization, may be incident on the liquid crystal panel 6.

Here, the non-uniformity in the incident angle of the illuminating flux L which is incident on the liquid crystal panel 6 is less than that of the first polarization conversion optical system 5. Therefore, the loss of light quantity may be reduced, and the light utilizing efficiency of the liquid crystal projection apparatus 100 may be improved and a brighter image may be projected onto the screen.

In addition, the light incident regions of the first through third polarization conversion optical systems 5, 15, and 25 are respectively divided into two, four, and two regions. However, the present invention is not limited thereto. For example, two or more units of the first, second, or third polarization conversion optical system 5, 15, or 25 are disposed to be adjacent to each other, and thus, the number of divided light incident regions may be increased.

In addition, the half-wave plate 11 or 17 is disposed on the first region $S_1$ or $S_{1a}$ and $S_1$, to convert the S-polarization or y-axis polarization into the P-polarization or x-axis polarization. However, the half-wave plate 11 or 17 may be disposed on the second region $S_2$ or $S_{2b}$ and $S_{2d}$ to convert the P-polarization or the x-axis polarization into the S-polarization or the y-axis polarization.

The total area of the light incident region forming the light incident portion and the total area of the light exit portion including the first and second regions are equal to each other, however, the area of the light exit portion may be less than that of the light incident portion according to the size of effective pixel area of the liquid crystal panel 6. For example, when a polarization hologram is used, the area of the light exit portion may be less than that of the light incident portion.

In addition, in the above embodiments, a polarization splitting surface divides the polarization direction by proceeding one polarization component straight and deviating the other polarization component to be inclined, however, the polarization splitting surface may divide the polarization direction by deviating the two polarization components at different angles with respect to an optical axis. In this case, the light incident regions and the first and second regions may not be symmetrical with each other about the optical axis.

In addition, the fluxes of the same polarization direction incident through different incident regions transmit through the first and second regions, respectively. However, at least a part of the first region and the second region may be a common transmission region for transmitting the polarization component from different incident regions.

For example, in the second polarization conversion optical system 15, a polarization hologram surface which proceeds the y-axis polarization straight and divides the x-axis polarization toward the fourth exit region 16D may be formed instead of the first polarization hologram surface 16*a*, and a polarization hologram surface which proceeds the x-axis polarization straight and divides the y-axis polarization toward the third exit region 16C may be formed instead of the fourth polarization hologram surface 16*d*. Then, the y-axis polarized fluxes reach the first regions $S_{1a}$ and $S_{1c}$, and the x-axis polarized fluxes reach the second regions $S_{2b}$ and $S_{2d}$, however, the first region $S_{1a}$ and the second region $S_{2b}$ only transmit the fluxes incident through one light incident region, and thus the regions $S_{1a}$ and $S_{2b}$ are not common transmitting regions. In this case, the polarization direction may be aligned without enlarging the diameter of the flux.

The components described in the present specification may be combined appropriately within the technical scope of the present invention. For example, the blazed gratings 21 may include the polarization hologram device.

Here, the terminologies used in the above embodiments may correspond to terminologies used in the claims as follows.

The illuminating flux L and the first through third illuminating fluxes $L_R$, $L_G$, and $L_B$ correspond to flux. The first and second incident prism surfaces 9*a* and 10*a* are examples of light incident regions, light incident surfaces, and light incident portions. The first through fourth polarization hologram surfaces 16*a*, 16*b*, 16*c*, and 16*d* are examples of light incident regions, light incident surfaces, light incident portions, and polarization splitting surfaces. The first regions $S_1$ or $S_{1a}$ and $S_1$, and the second regions $S_2$ or $S_{2b}$ and $S_{2d}$ are examples of light exit portions. The half-wave plates 11 and 17 are examples of polarization conversion devices. The first and second S-polarized fluxes $L_{S1}$ and $L_{S2}$ and the first through fourth y-polarized fluxes $L_{ya}$, $L_{yb}$, $L_{yc}$, and $L_{yd}$ are examples of a first polarization component. The first and second P-polarized fluxes $L_{P1}$ and $L_{P2}$, and the first through fourth x-axis polarized fluxes $L_{xa}$, $L_{xb}$, $L_{xc}$, and $L_{xd}$ are examples of a second polarization component. The first through third polarization conversion optical systems 5, 15, and 25 are examples of polarization conversion optical systems. The Senarmont prism 10 is an example of a first prism, and the Rochon prism 9 is an example of a second prism.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polarization conversion optical system comprising:
   a light incident surface, on which light is incident along an optical axis, wherein the light incident surface is divided into at least first and second light incident regions;
   a light exit surface including a light transmitting area which is not larger than an area of the light incident surface, wherein the light exit surface is divided into at least first and second light exit regions;
   a polarization conversion device which faces the first light exit region, and which converts a polarization direction of light incident thereon by 90°; and
   a plurality of polarization separating surfaces which:
      divide polarizations of light incident thereon into a first polarization component and a second polarization component which are perpendicular to each other, by deviating at least one of the first and second polarization components in a direction inclined with respect to the optical axis, and
      emit the first polarization component through the first light exit region and emit the second polarization component through the second light exit region.

2. The polarization conversion optical system of claim 1, wherein the first and second light exit regions are common transmitting regions which transmit the first and second polarization components respectively from the plurality of the polarization separating surfaces.

3. The polarization conversion optical system of claim 1, wherein the plurality of polarization separating surfaces comprise:
   a prism surface of a first prism which transmits the first polarization component of a first light incident thereon without refraction, and refracts the second polarization component of the first light to be inclined with respect to the optical axis; and
   a prism surface of a second prism which transmits the second polarization component of a second light incident thereon without refraction, and refracts the first polarization component of the second light to be inclined with respect to the optical axis.

4. The polarization conversion optical system of claim 3, wherein the first prism and the second prism comprise a Rochon prism and a Senarmont prism, respectively.

5. A liquid crystal projection apparatus comprising the polarization conversion optical system according to claim 3.

6. The polarization conversion optical system of claim 1, wherein the plurality of polarization separating surfaces comprise a plurality of polarization hologram surfaces.

7. A liquid crystal projection apparatus comprising the polarization conversion optical system according to claim 6.

8. The polarization conversion optical system of claim 1, further comprising a plurality of blazed gratings, on which light from the light exit surface is incident, which change the direction of the light incident thereon according to the polarization components, to thereby transmitting substantially parallel light.

9. A liquid crystal projection apparatus comprising the polarization conversion optical system according to claim 1.

10. A liquid crystal projection apparatus comprising:
    a cross-dichroic prism;
    one or more light sources which face respective incident surfaces of the cross-dichroic prism;
    a polarization conversion optical system according to claim 1 disposed between the one or more light sources and each of the respective incident surfaces of the cross-dichroic prism;
    a liquid crystal panel disposed between the polarization conversion optical system and each of the respective incident surfaces of the cross-dichroic prism; and
    a projection lens facing an exit surface of the cross-dichroic prism.

11. The liquid crystal projection apparatus of claim 10, further comprising one or more light tunnels disposed between each of the respective incident surfaces of the cross-dichroic prism and the one or more light sources.

12. A polarization conversion optical system comprising:
    at least a first region and a second region adjacent to the first region;
    a polarization separating device comprising:
    a first polarization separating surface, disposed in the first region, which transmits light having a first polarization component without deviation, and which deviates light having a second polarization component, perpendicular to the first polarization component;
    a second polarization separating surface, disposed in the second region, which transmits light having the second polarization component without deviation, and which deviates light having the first polarization component; and
    an exit region through which light is emitted, wherein the exit region comprises a first exit region in the first region and a second exit region in the second region; and
    wherein light having the first polarization component is emitted from the polarization separating device through the first exit region and light having the second polarization component is emitted from the polarization separating device through the second exit region; and
    a polarization conversion device, disposed in the second region, which converts the light having the second polarization component by 90°, to thereby emit light having the first polarization component.

13. The polarization conversion optical system of claim 12, wherein:
    the polarization separating device comprises a Ronchon prism disposed in the first region and a Senarmont prism disposed in the second region;
    the first polarization separating surface is a polarization separating surface of the Ronchon prism and the second polarization separating surface is a polarization separating surface of the Senarmont prism.

14. The polarization conversion optical system of claim 12, wherein:
    the first and second polarization separating surfaces are polarization hologram surfaces.

15. The polarization conversion optical system according to claim 12, further comprising:
a first blazed grating, disposed in the first region, which transmits light output from the first exit region without diffraction, diffracts light output from the second exit region and outputs substantially parallel light; and
a second blazed grating, disposed in the second region, which transmits light output from the second exit region without diffraction, diffracts light output from the first exit region and outputs substantially parallel light.

* * * * *